United States Patent [19]

Buljan

[11] Patent Number: 4,650,498
[45] Date of Patent: Mar. 17, 1987

[54] ABRASION RESISTANT SILICON NITRIDE BASED ARTICLES

[75] Inventor: Sergej-Tomislav Buljan, Acton, Mass.

[73] Assignee: GTE Laboratories Incorporated, Waltham, Mass.

[21] Appl. No.: 681,734

[22] Filed: Dec. 14, 1984

[51] Int. Cl.⁴ .............................................. C09C 1/68
[52] U.S. Cl. ....................................... 51/309; 51/308
[58] Field of Search ................................. 51/308, 309

[56] References Cited

U.S. PATENT DOCUMENTS

| | | | |
|---|---|---|---|
| 2,913,312 | 11/1959 | Dubeck | 51/309 |
| 4,022,584 | 5/1977 | Rudy | 228/122 |
| 4,076,506 | 2/1978 | Valdsaar | 51/308 |
| 4,381,931 | 5/1983 | Hunold et al. | 51/309 |
| 4,433,979 | 2/1984 | Sarin et al. | 51/309 |
| 4,441,894 | 4/1984 | Sarin et al. | 51/309 |
| 4,449,989 | 5/1984 | Sarin et al. | 51/309 |

*Primary Examiner*—Lorenzo B. Hayes
*Assistant Examiner*—Willie J. Thompson
*Attorney, Agent, or Firm*—Ivan L. Ericson

[57] ABSTRACT

Composite articles and cutting tools are prepared by densification to form a body consisting essentially of particles of hard refractory boride uniformly distributed in a silicon nitride matrix consisting essentially of a first phase and a second phase. The first phase consists essentially of crystalline silicon nitride and the second phase is an intergranular refractory phase comprising silicon nitride and a suitable densification aid selected from the group consisting of yttrium oxide, cerium oxide, zirconium oxide, hafnium oxide and the lanthanide rare earth oxides and mixture thereof. The resulting composite article or cutting tool has a fracture toughness equal to or greater than about 4 MN/m$^{3/2}$.

15 Claims, 1 Drawing Figure

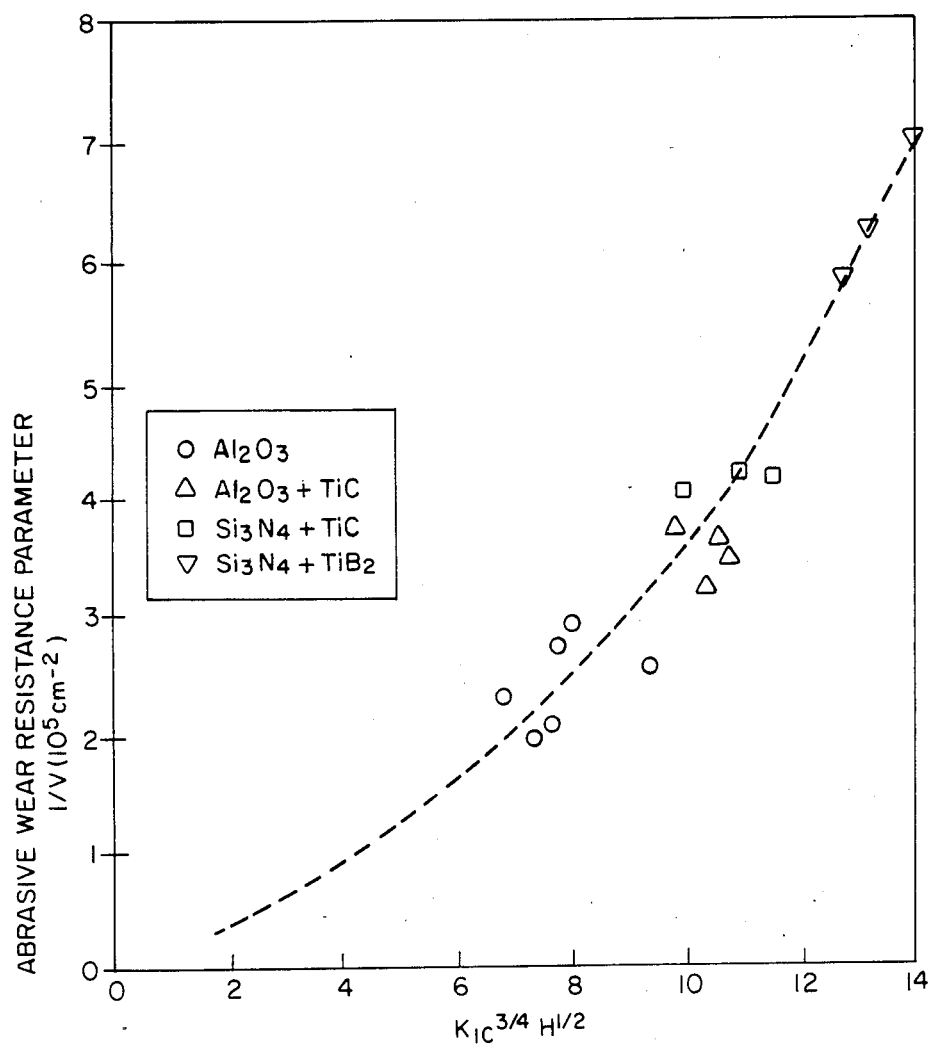

ABRASION RESISTANT SILICON NITRIDE BASED ARTICLES

FIELD OF THE INVENTION

This invention relates to abrasion resistant materials and to articles of manufacture made therefrom. More particularly, it is concerned with abrasion resistant materials comprising a hard refractory boride distributed in a matrix containing silicon nitride, and with articles made therefrom.

BACKGROUND OF THE INVENTION

The need for cutting tool materials with improved toughness, good strength at elevated temperatures and chemical inertness capable of operating at high cutting speeds has generated a widespread interest in ceramic materials as candidates to fulfill these requirements. Conventional ceramic cutting tool materials have failed to find wide application primarily due to their low fracture toughness.

Therefore, many materials have been evaluated to improve ceramic cutting tool performance such as silicon nitride based composite cutting tools. Specific examples of silicon nitride based composite cutting tools are discussed in U.S. Pat. No. 4,388,085 to Sarin et al. (composite silicon nitride cutting tools containing TiC); U.S. Pat. No. 4,425,141 to Buljan et al. (a composite modified silicon aluminum oxynitride cutting tool containing refractory metal carbides, nitrides and carbonitrides); and U.S. Pat. No. 4,433,979 to Sarin et al. (composite silicon nitride cutting tools containing hard refractory carbides or nitrides of Ti, V, Cr, Zr, Nb, Mo, Hf, Ta, and W). Many improvements have been made in the toughness, high temperature strength and chemical inertness, but increased demands by the cutting tool industry require cutting tools with new and improved characteristics. The present invention provides such a new and improved ceramic cutting tool.

SUMMARY OF THE INVENTION

In accordance with the present invention, there is provided a composite article of manufacture consisting essentially of particles of a hard refractory boride distributed in a matrix, said matrix consisting essentially of a first phase of silicon nitride and a second intergranular phase consisting essentially of silicon nitride and an effective amount of a densification aid. The article possesses properties of high density, high abrasion resistance, high hardness, high fracture toughness, and resistance to oxidation at temperatures greater than 1200° C.

In accordance with other aspects of the present invention, there are provided cutting tools, a powder mixture, and a process for making the articles of the present invention from the powder mixture.

BRIEF DESCRIPTION OF THE DRAWING

The single FIGURE of the drawing is a curve of the abrasive wear resistance parameter of $Al_2O_3$, $Al_2O_3 + TiC$, $Si_3N_4 + TiC$ and $Si_3N_4 + TiB_2$ as a function of the product of (fracture toughness)$^{\frac{3}{4}}$ and (hardness)$^{\frac{1}{2}}$.

For a better understanding of the present invention, together with other and further objects, advantages and capabilities thereof, reference is made to the following disclosure and appended claims in connection with the above-described drawing.

DETAILED DESCRIPTION

Abrasion resistant articles according to the present invention comprise finely divided particles of a hard refractory boride dispersed in a matrix. By the term hard refractory boride, as used throughout this specification and appended claims, is meant any boride of titanium and/or hafnium or mixtures thereof.

The average particle size of the hard refractory boride incorporated into articles in accordance with this invention is chosen dependent upon the use of the article. The hard refractory boride particle size ranges below about 20 microns. For example, for cutting tool applications, the average boride particle size is chosen near the lower end of the range, preferably below about 5 microns. On the other hand, for mining tools and wear parts average boride particle sizes above 5 microns may be used.

The useful life and performance of articles in accordance with this invention depends, in large part, on the volume taken up by the particles of hard refractory boride in the article. The hard refractory boride should comprise from about 1% to about 60% by volume of the densified article. As discussed further below, the toughness of the articles decreases at concentrations of refractory boride in excess of 60% by volume. The preferred range of refractory boride content is from about 15% to about 50% by volume. A more preferred range is from about 20% to about 40% by volume.

In accordance with the principles of the present invention, the hard refractory borides are uniformly distributed in a matrix consisting essentially of a first phase and second phase. The first phase of the matrix consists essentially of silicon nitride. The second intergranular phase or secondary phase of the matrix comprises silicon nitride and an effective amount of a densification aid.

For optimizing the desirable properties, particularly high temperature strength of the composite of the present invention, it is preferable to maximize the high temperature stability of the secondary intergranular phase and maximize the density of the final densified composites. While the densification aid is essential to achieve highest densities, that is, densities approaching theoretical, greater than 99%, improper composition of the second phase can deleteriously affect maximum attainable high temperature strength and creep resistance. The densification aids of the present invention stabilize the secondary phase to such an extent that the secondary phase is a refractory phase having desirable high temperature properties. Typical densification aids are yttrium oxide, cerium oxide, zirconium oxide, hafnium oxide and the lanthanide rare earth oxides and mixtures thereof. Yttrium oxide, cerium oxide and hafnium oxide are preferred densification aids. The densification aid is employed from a lower effective amount which permits high theoretical densities to an upper amount which does not unduly effect the high temperature properties. Preferably the densification aid comprises from about 1% to about 25% by weight of the matrix. More preferably, from about 1% to about 5% by weight of the matrix.

For optimizing the desirable high temperature properties of the composite of the present invention, it is desirable to minimize the presence of any additive such as aluminum oxide, at least to the extent that the favorable desirable high temperature properties of the final article are unfavorably effected by alteration of the secondary phase. Preferably aluminum oxide is present in the matrix material in an amount less than about 5% by weight based on the total weight of the matrix material, more preferably less than about 3% by weight.

The secondary intergranular phase may contain further additional materials in the form of additives and impurities in addition to the hereinbefore mentioned densification aids and additives such as aluminum oxide. Such further additional materials may contribute to the desirable final properties. Such further additional materials are preferably present in an amount less than about 5% by weight based on the weight of the secondary phase. It is contemplated that silicon oxide may be a desirable additive. In case of silicon nitride bodies having a crystalline silicon nitride phase and a secondary phase, it has been found that silicon oxide present in a effective amount enables optimization of oxidation resistance in such bodies, see U.S. Pat. No. 4,350,771 to Smith.

Impurities may be present in the starting powder used for the manufacture of the composite of the present invention. These impurities tend to become concentrated in the intergranular phase during preparation of the composite. High purity starting materials are desired, preferably less than about 0.1 weight percent cation impurities. A typical undesirable impurity is calcium which tends to deleteriously affect the secondary intergranular phase and high temperature properties.

The materials described herein have a composite microstructure of particulate refractory boride grains, uniformly dispersed in a matrix containing a phase of $Si_3N_4$ grains, and a continuous intergranular phase comprising silicon nitride and the densifying additive. As hereinbefore mentioned, impurities and additives present in the body tend to concentrate in the secondary intergranular phase. Because the intergranular phase is continuous, its characteristics profoundly affect the high temperature properties of the composite material. The composite of the present invention possess high strength at temperatures in excess of 1200° C., preferably in excess of 1500° C.

In accordance with the invention, a method is provided for sintering a composite to densities approaching theoretical density, greater than 99% of theoretical while maintaining optimum levels of mechanical strength at both room temperature and elevated temperature, making the composite particularly useful as cutting tools in metal removing applications.

In accordance with one aspect of the present invention, the starting powder composition consists essentially of from about 25% to about 95% by weight of a silicon nitride powder, from about 1% to about 10% by weight of a powdered densification aid, and from about 5% to about 40% by weight of refractory boride particles. Additional ingredients are preferably present in the starting powder in amounts less than 5% by weight based on total weight of the starting powder.

The hard refractory boride particulate is dispersed in a two phase matrix which is compacted to a high density by sintering or hot pressing techniques. A composition for the production of abrasion resistant materials according to the present invention may be made by employing $Si_3N_4$ powder, generally of particle size below about 3 microns, which is preferably either partly crystallized amorphous material or a mixture of substantially completely amorphous and substantially completely crystalline material. The crystalline $Si_3N_4$ which may be either the alpha or the beta polymorph or a mixture of these is preferably present in the amount of from 5% to 60% by weight of the total amount of $Si_3N_4$ powder, the remainder being substantially amorphous. Silicon nitride ceramics produced from such starting materials exhibit good to excellent densities and modulus of rupture values, as well as acceptable shrinkage values of the powder compacts during sintering.

The percent crystallinity of the starting material, if unknown, may be determined either by X-ray diffraction techniques, in which the intensity of the diffraction peaks of crystalline material is compared to a standard, or by infrared spectroscopy, in which the relative intensities of the broad absorption peak of the amorphous material and the narrow peaks of the crystalline material are compared.

Densification of the silicon nitride, hard refractory boride composite is aided by the incorporation of a densification aid into the initial composition. In the initial powder compositions employed in the fabrication, the densification aid comprises initially from about 1% to about 10% by weight of the powder composition and the hard refractory metal boride comprises from about 1% to about 60% of the total volume of the densified article as set out above. In the densified article, the balance of the article comprises the matrix of polycrystalline silicon nitride and the densification aid. In this densified article, the densification aid makes up from about 1% to about 25% by weight of the host matrix. The starting materials may be processed to a powder compact of adequate green strength by thoroughly mixing the starting materials by processes such as ball milling in a nonreactive liquid medium, such as toluene or methanol, and consolidating the mixture by pressing, extruding, or slip casting. Processing may also optionally include a presintering or prereacting step in which either the uncompacted powder or the powder compact is heated at moderate temperatures. Details of the fabrication of articles in accordance with this invention are given below in Methods I and II.

The host matrix comprises a two phase system made up of a first phase silicon nitride grains and a secondary phase of silicon nitride including a densification aid. The particles of a hard refractory boride are uniformly dispersed throughout this matrix. Since the strength of articles in accordance with this invention decreases with increasing porosity in the total compact, it is important that the compact be sintered or pressed to a density as nearly approaching 100% theoretical density as possible, preferably greater than 99% of theoretical density. The measure of percent theoretical density is obtained by a weighted average of the densities of the components of the compact. Particular resistance to oxidation is conferred upon abrasion resistant articles of this invention by preferred densification aids. Yttrium oxide, cerium oxide and hafnium oxide are preferred densification aids.

The density of silicon nitride based articles obtained by nitriding techniques or reaction bonding methods such articles is generally of the order of about 80% of theoretical.

Densified ceramic articles made in accordance with this invention are hard, nonporous, abrasion resistant, and resistant to oxidation. Applications of these articles include, but are not limited to cutting tools, mining tools, stamping and deep-drawing tools, extrusion dies, wire and tube drawing dies, nozzles, guides, bearings, and wear-resistant, and structural parts.

Hard abrasion resistant cutting tools having improved resistance to oxidation can be fabricated in accordance with this invention by distributing particles of a hard refractory boride in a two phase matrix comprising polycrystalline silicon nitride and a densification aid.

Abrasion wear resistance is proportional to the product of hardness and fracture toughness ($H^{\frac{1}{2}}K_{IC}^{\frac{1}{4}}$). Comparing the abrasion wear resistance of materials prepared in accordance with this invention with that of the state of the art ceramics for cutting tool application, we find that materials of this invention exhibit superior abrasion wear resistance, e.g., $Si_3N_4+TiB_2$ being greater than 5 $1/V(10^5 \text{ cm}^{-2})$ (see FIGURE).

To enable one skilled in the art to practice this invention, the following example is provided: Silicon nitride composite bodies containing titanium diboride, $TiB_2$ that were hot pressed at a temperature of $1560°\pm5°$ C., and at a pressure of 8300 psi for 60 minutes to obtain a density of greater than 99% of theoretical have hardness values higher than those observed for silicon nitride noncomposite or TiC composite articles:

|  | Hardness $GN/m^2$ |
|---|---|
| ($Si_3N_4$, 6 w/o, $Y_2O_3$) 30 v/o$TiB_2$ | 15.8 |
| ($Si_3N_4$, 11 w/o, HfO) 30 v/o$TiB_2$ | 16.4 |
| ($Si_3N_4$, 6 w/o, $Y_2O_3$) 30 v/oTiC | 15.0 |
| ($Si_3N_4$, 6 w/o, $Y_2O_3$) — | 12.5 |

The fracture toughness values of the silicon nitride composite bodies containing titanium diboride, $TiB_2$, were equal to or greater than 4 $MN/m^{3/2}$. The range of the fracture toughness values was from about 4 to about 5 $MN/m^{3/2}$. This was an unexpected result since titanium diboride by itself is commonly low, ranging from 2-3 $MN/m^{3/2}$.

Relative fracture toughness values were obtained by an indentation fracture test utilizing a Vickers diamond pyramid indenter. In this test the length of cracks developed at the corners of the indentation and the indentation size are used to obtain fracture toughness ($K_{IC}$) values by a relationship:

$$K_{IC} = 0.113 \, HD^{\frac{1}{2}} \left[ 1 + \frac{C_L}{2D} \right]^{-3/2}$$

where
$K_{IC}$ = fracture toughness ($MN/m^{3/2}$)
H = hardness ($GN/m^2$)
D = indentation diagonal ($\mu m$)
$C_L$ = sum of cracks ($\mu m$)

Values obtained by this method for fracture toughness of common $Al_2O_3$ and $Al_2O_3$-TiC composite cutting tool materials range from 2-2.5 $MN/m^{3/2}$ and 3-3.5 $MN/m^{3/2}$, respectively.

Values for fracture toughness obtained by other methods may indicate different absolute values and the comparison of material is only valid if common standards are used for normalization.

The above Example is not to be viewed as limiting the scope of the invention as claimed, but is intended only to be illustrative thereof. The materials of the example above can be prepared by hot pressing or sintering techniques detailed in Methods I and II below.

In one method, pressed green compacts containing silicon nitride, a particulate hard refractory boride and a sintering or densification aid are sintered to a dense, polycrystalline product. In a second method, dry powdered mixtures of silicon nitride, a particulate hard refractory boride, and a densification aid are hot pressed to produce a shaped article comprising a polycrystalline highly densified product.

METHOD I

To one part of a mixture of silicon nitride, hard refractory boride, and densification aid are added about 2.5 parts by weight toluene, about 0.1 parts methanol, and about 0.05 parts stearic acid. The resulting slurry is thoroughly mixed by ball milling and then dried at 105° C. The resulting dry mixture is ball milled for about 24 hours and then mixed with about 0.05 parts by weight of polyethylene glycol-methoxy polyethylene glycol copolymer, 1 part toluene and about 0.05 parts methanol. This mixture is ball milled for about 15 minutes, dried at 105° C. and then screened through a 60 mesh screen. The −60 mesh fraction is pressed at about 25,000 psi to obtain a green compact. The residual solvents and binders in the green compact are removed by heating at 600° C. in an inert atmosphere. The green compact is then sintered to a hard, highly densified product by heating to temperatures of 1500°-1750° C.

METHOD II

To one part of a mixture of silicon nitride, hard refractory boride, and densification aid are added about 2.5 parts by weight toluene and about 0.1 parts methanol. The resulting slurry is thoroughly mixed by ball milling and then dried at 105° C. The dry mixture is ball milled for about 24 hours and then screened through a 60 mesh screen. The −60 mesh fraction is pressed at about 3000-9000 psi and about 1600° C. to produce a hard, highly densified product.

While there have been shown what are at present considered to be the preferred embodiments of the invention, it will be obvious to those skilled in the art that various changes and modifications may be made therein without departing from the scope of the invention as defined by the appended claims.

What is claimed is:

1. A densified composite ceramic article consisting essentially of particles of a hard refractory boride uniformly distributed in a two phase matrix, said two phase matrix consisting essentially of a first phase and a second intergranular phase, said first phase consisting essentially of crystalline silicon nitride, said second intergranular phase consisting essentially of silicon nitride and a densification aid, said densified composite ceramic article having a density greater than 99% of theoretical density, a high abrasion resistance, a high hardness, a fracture toughness equal to or greater than 4 $MN/m^{3/2}$, and a resistance to oxidation at temperatures greater than 1200° C.

2. A densified composite ceramic article in accordance with claim 1 wherein said hard refractory boride comprises from about 1 to about 60 volume percent of said article.

3. A densified composite ceramic article in accordance with claim 1 wherein said particles of hard refractory boride comprise from about 15 to about 50 volume percent of said article.

4. A densified composite ceramic article in accordance with claim 1 wherein said particles of a hard refractory boride are selected from the group consisting of titanium boride, hafnium boride, and mixtures thereof.

5. A densified composite ceramic article in accordance with claim 1 wherein said densification aid is selected from the group consisting of yttrium oxide, cerium oxide, zirconium oxide, hafnium oxide, the lanthanide rare earth oxides and mixtures thereof.

6. A densified composite ceramic article in accordance with claim 1 wherein said particles of hard refractory boride are of an average size less than about 20 microns.

7. A densified composite ceramic article in accordance with claim 1 wherein said densification aid comprises from about 1 to about 25 weight percent of said composite article.

8. A densified composite ceramic article in accordance with claim 1 wherein said hard refractory boride consists essentially of titanium boride.

9. A densified composite ceramic cutting tool consisting essentially of particles of a hard refractory boride uniformly distributed in a two phase matrix, said two phase matrix consisting essentially of a first phase and a second intergranular phase, said first phase consisting essentially of crystalline silicon nitride, said second intergranular phase consisting essentially of silicon nitride and a densification aid, said two phase matrix containing less than 3 weight percent aluminum oxide, said densified composite ceramic article having a density greater than 99% of theoretical density, a high abrasion resistance, a high hardness, a fracture toughness equal to or greater than 4 $MN/m^{3/2}$, and a resistance to oxidation at temperatures greater than 1200° C.

10. A densified composite ceramic cutting tool in accordance with claim 9 wherein said hard refractory boride is selected from the groups consisting of titanium boride, hafnium boride and combinations thereof.

11. A densified composite ceramic cutting tool in accordance with claim 9 wherein said hard refractory boride comprises from about 1 to about 60 volume percent of said composite ceramic cutting tool.

12. A densified composite ceramic cutting tool in accordance with claim 9 wherein said hard refractory boride comprises from about 15 to about 50 volume percent of said composite ceramic cutting tool.

13. A densified composite ceramic cutting tool in accordance with claim 9 wherein said densification aid is selected from the group consisting of yttrium oxide, cerium oxide, hafnium oxide, zirconium oxide, the rare earth lanthanide oxides, and mixtures thereof.

14. A densified composite ceramic cutting tool in accordance with claim 9 wherein said densification aid comprises from about 1 to about 25 weight percent of said composite ceramic cutting tool.

15. A densified composite ceramic cutting tool in accordance with claim 9 wherein the particle size of said hard refractory is below about 20 microns.

* * * * *